United States Patent [19]

Shimizu et al.

[11] Patent Number: 4,973,957
[45] Date of Patent: Nov. 27, 1990

[54] DATA COLLECTING SYSTEM

[75] Inventors: Giichiro Shimizu; Misao Shimizu; Hajime Takeuchi; Toshiharu Okuyama; Yoshio Wakatsuki, all of Tokyo, Japan

[73] Assignee: Man Design Co., Ltd., Tokyo, Japan

[21] Appl. No.: 348,170

[22] Filed: May 2, 1989

Related U.S. Application Data

[63] Continuation-in-part of Ser. No. 111,671, Oct. 23, 1987, abandoned.

[30] Foreign Application Priority Data

Jan. 22, 1987 [JP] Japan .................................. 62-12700
Feb. 6, 1987 [JP] Japan .................................. 62-24786

[51] Int. Cl.$^5$ ........................ H04Q 29/00; G01B 1/00
[52] U.S. Cl. ............................. 340/825.520; 33/504;
340/825.690; 340/825.720; 340/825.060;
364/550
[58] Field of Search ...................... 33/504, 505, 474.01;
364/550, 552-564; 340/825.06, 825.07, 825.69,
825.72, 825.52, 825.53, 870.02, 870.03, 870.01,
825.5, 825.51

[56] References Cited

U.S. PATENT DOCUMENTS

| | | |
|---|---|---|
| 3,555,502 | 1/1971 | Davis et al. . |
| 4,118,871 | 10/1978 | Kirkham .................... 33/504 |
| 4,257,107 | 3/1981 | Heymsfield et al. ............ 364/560 |
| 4,334,221 | 6/1982 | Rosenhagen et al. ...... 340/825.69 X |
| 4,586,150 | 4/1986 | Budziak et al. .............. 364/562 |
| 4,642,899 | 7/1985 | Fass et al. . |
| 4,677,755 | 7/1987 | Iwano et al. ................... 33/504 |
| 4,736,313 | 4/1988 | Nishimura et al. ............ 364/563 |

FOREIGN PATENT DOCUMENTS

| | | |
|---|---|---|
| 3129153 | 2/1983 | Fed. Rep. of Germany . |
| 3506306A1 | 9/1985 | Fed. Rep. of Germany . |
| 3511504A1 | 10/1986 | Fed. Rep. of Germany . |
| 2133251A | 7/1984 | United Kingdom . |
| 2165126A | 4/1986 | United Kingdom . |
| 2171525A | 8/1986 | United Kingdom . |

OTHER PUBLICATIONS

Ein frei programmierbares mikroprozessorgesteuertes Datensystem für die Erfassung, Übertragung, Speicherung und Auswertung von Messwerten article, pp. 475–481 Jul./Aug. 1982.

Primary Examiner—Ulysses Weldon
Attorney, Agent, or Firm—Nixon & Vanderhye

[57] ABSTRACT

A host apparatus collects the physical or chemical quantities of articles, which have been measured by a plurality of measuring devices, for example, vernier calipers. Each calipers has a caliper unit as a measuring means, a dip-switch, a CPU, a RAM, and a transmitter. The caliper unit has an analog-to-digital (A/D) converter. The dip-switch is operated, thus setting an ID number of the device, before the device is used. The ID number is stored into the RAM. When the transmission button of the device is pushed, the CPU edits the digital value supplied from A/D converter and the ID number stored in the RAM, thereby forming a serial-data message. This message is transmitted by a transmitter, in the form of a radio message. The host apparatus has a receiver and a host computer. The receiver received the serial-data messages transmitted from the measuring devices. The host computer collects the values measured by the devices and contained in the serial-data messages, in accordance with the ID numbers also contained in the serial-data messages.

5 Claims, 6 Drawing Sheets

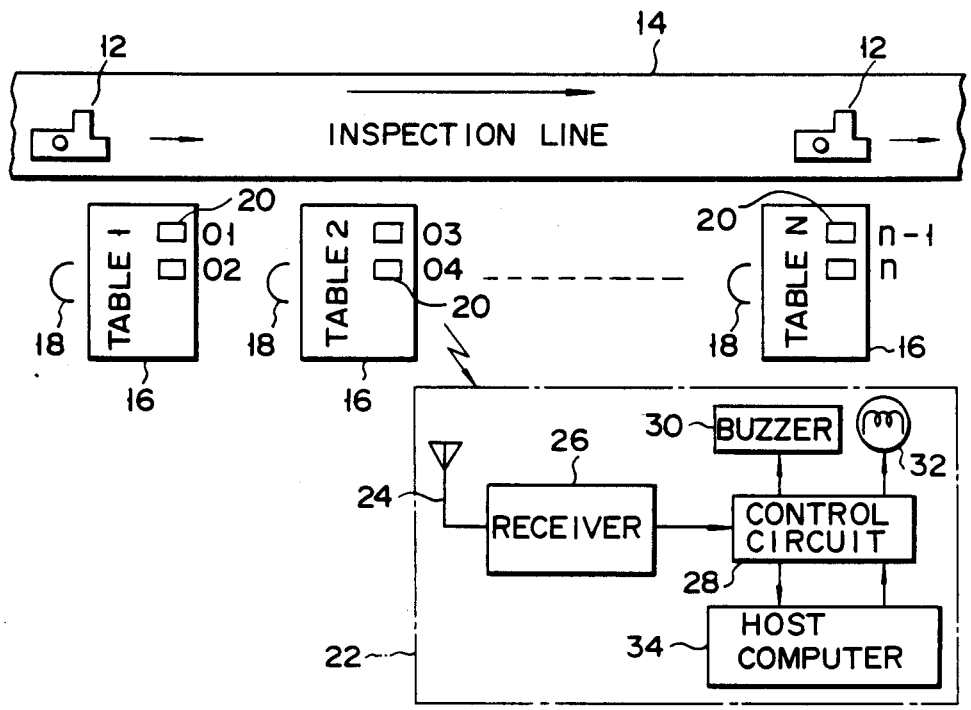
F I G. 1
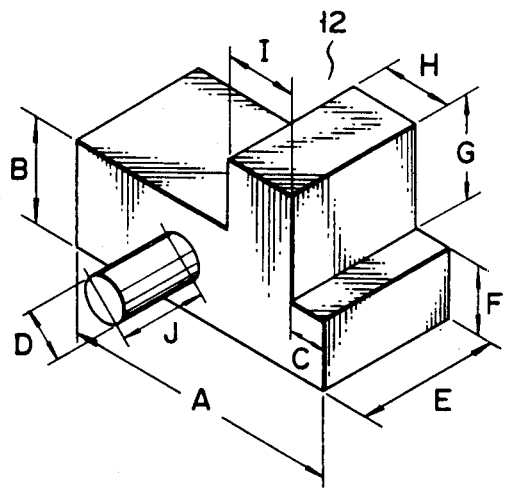
F I G. 2

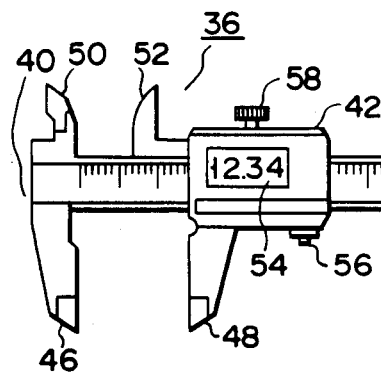
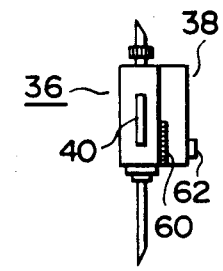
FIG. 3A  FIG. 3B
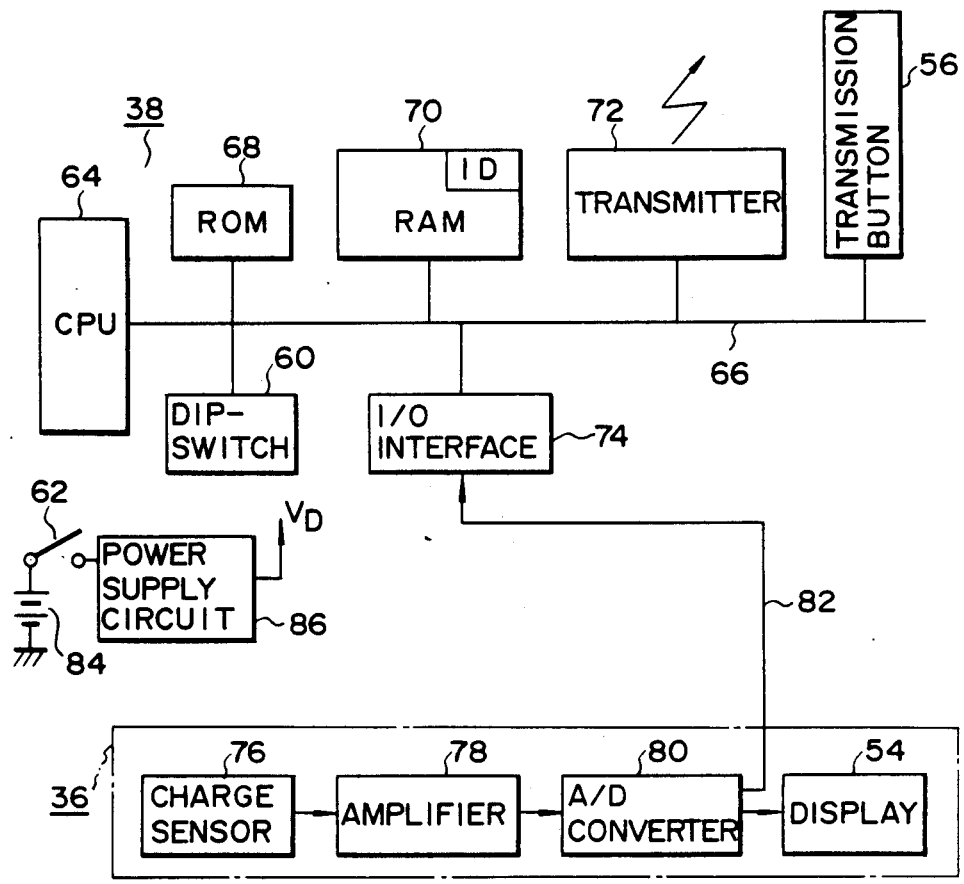
FIG. 4

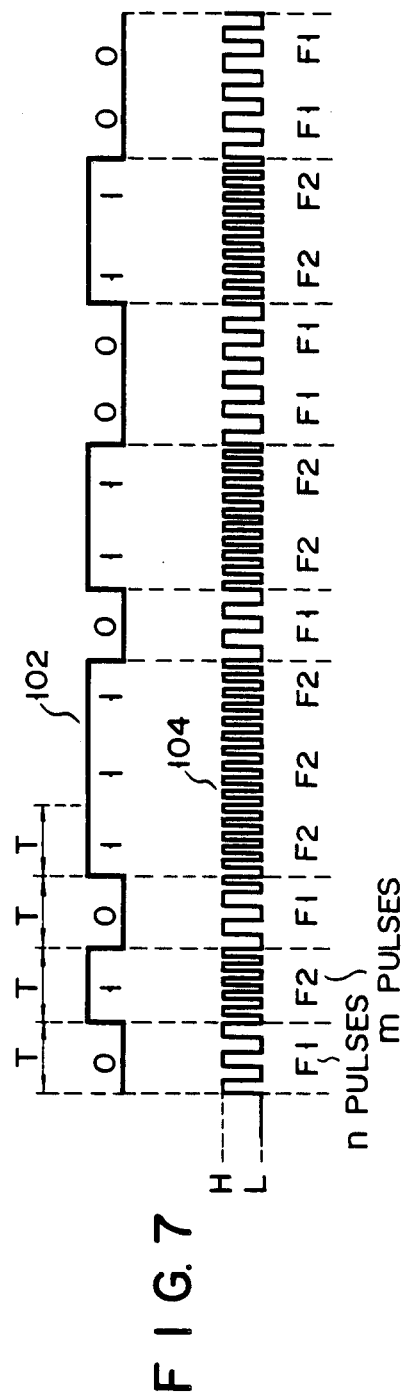

DATA COLLECTING SYSTEM

This is a continuation-in-part of application Ser. No. 07/111,671, filed Oct. 23, 1987, now abandoned.

BACKGROUND OF THE INVENTION

The present invention relates to a data collecting system, in which various values (physical or chemical quantities) measured by a plurality of measuring devices are collected or accumulated in one host apparatus.

In a factory, products are subjected to various inspections. An inspection line is provided in the factory to inspect the products. Measuring devices of various types are arranged along the inspection line. As the products are moved in the inspection line, their physical or chemical quantities are measured by means of the measuring devices. Pieces of data representing the physical or chemical quantities measured by the devices are collected in a host apparatus. The data collected in the host apparatus is used to calculate the quality and yield of the products.

There are various kinds of inspection performed on the products. One of them is the size-measuring of products. When the products have a complicated shape, ten or more dimensional values must be measured for each product. One person may use vernier calipers to measure all these dimensional values. Usually, however, several persons use vernier calipers or similar measuring devices, each person measuring a few dimensional values, This method is preferred since the work efficiency is higher, and the error rate is lower, than when each person measures all dimensional values of the product. Hence, many measuring devices of the same type are required in most cases.

The values measured by the measuring devices are collected in the host apparatus of a data collecting system. The data collection system comprises the measuring devices, cables, and relays. The measuring devices are connected to the relays by the cables, and the relays are coupled to the host computer provided within the host apparatus. Each relay has an input connector, to which a specific number is assigned. The number of the input connector is used as the identification (ID) number of the measuring device connected to the relay by the cable. The host computer can identify each measuring device with this ID number.

The host computer of the data collecting system contains a program defining what dimensional values should be measured of each product, and also in what order they should be measured. Several persons take their positions along the inspection line. The first person measures the first dimensional value of each product, by using his measuring device. The second person measures the second dimensional value of the product, and so forth. The values measured by these persons are automatically transmitted from the measuring devices to the host computer through the cables and the relays. The host computer identifies each measured dimensional value in accordance with the connector number of the relay through which this value has been transmitted, and also the time at which this value has been input to the host apparatus.

The data collecting system described above has some drawbacks, however. The cable connecting each measuring device to the relay coupled to the host computer may hinder the person using the device in his work, particularly when the measuring device is vernier calipers. In short, the cable may reduce the work efficiency. Further, the number of measuring devices which can be connected to one relay is limited. Hence, the more measuring devices, the more relays. An increase in the number of relays no doubt results in an increase in the size and cost of the data collection system. In order to eliminate this problem, one measuring device can be disconnected from an input connector of a relay after it has been used to measure a dimensional value, and another measuring device can then be connected to the same input connector. This disconnection/connection process is rather cumbersome and time-consuming. Not only will it decrease the work efficiency, but it is also likely to be erroneously performed.

SUMMARY OF THE INVENTION

It is accordingly the object of the present invention to provide a data collecting system which can increase the efficiency of measuring the physical or chemical quantities of products, and in which a host apparatus can correctly identify measured values, accurately classify these values, and appropriately collect these values.

To accomplish this object, a data collecting system according to the invention comprises a plurality of measuring devices, each capable of outputting radio signals representing an identification (ID) number assigned to it and also the value it has measured, and a host apparatus for receiving the radio signals from the measuring devices, thereby collecting the values measured by these devices and represented by the radio signals, in accordance with the ID numbers represented by the radio signals.

BRIEF DESCRIPTION OF THE DRAWINGS

FIG. 1 is a diagram schematically showing a data collecting system according to the present invention;

FIG. 2 is a perspective view of a product whose dimensional values can be measured by the measuring devices provided in the data collecting system shown in FIG. 1;

FIG. 3A is a front view of vernier calipers which can be used as a measuring device in the data collecting system shown FIG. 1;

FIG. 3B is a side view of the vernier calipers shown in FIG. 3A;

FIG. 4 is a block diagram schematically showing the control section and measuring section of the vernier calipers illustrated in FIGS. 3A and 3B;

FIG. 6 shows the serial format of a radio message containing the values measured of the product illustrated in FIG. 2;

FIG. 7 is a timing chart representing the relationship between the serial data signals forming the radio message of FIG. 6 and the frequency-modulated signal representing the radio message.

DETAILED DESCRIPTION OF THE PREFERRED EMBODIMENT

Figure 5A:
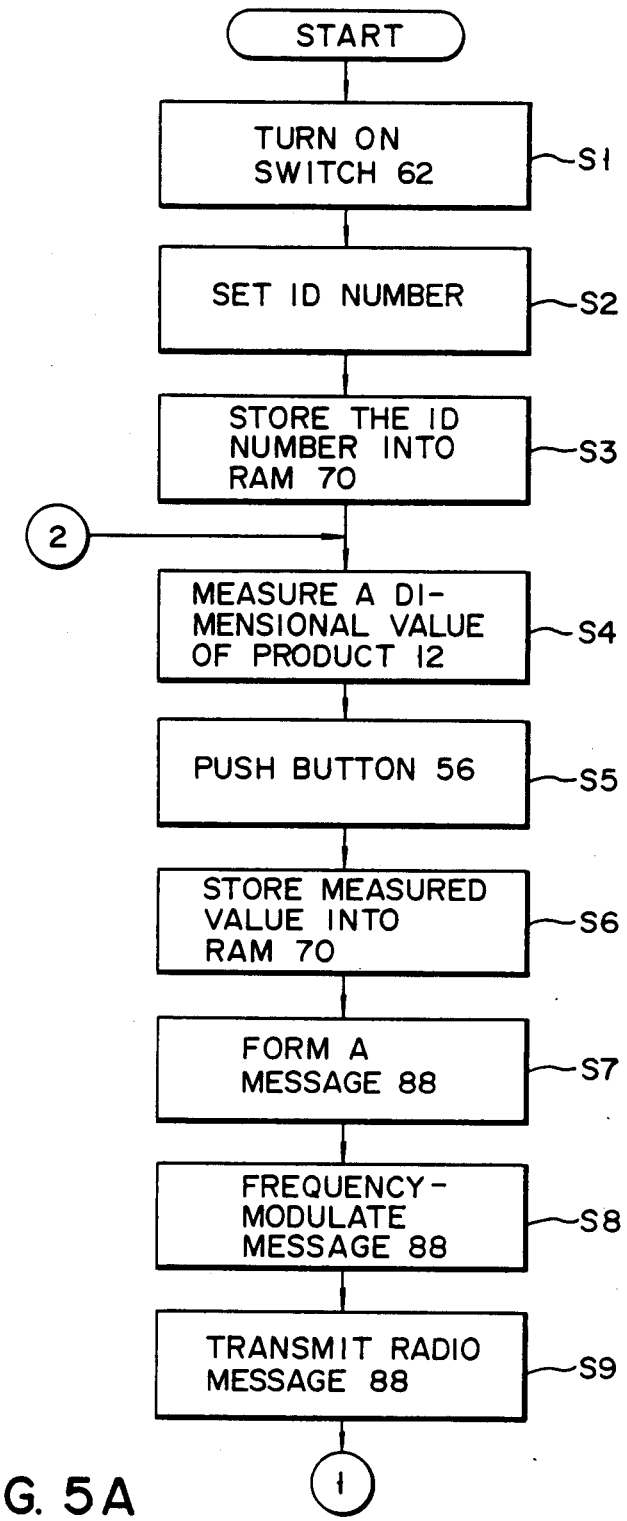
FIGS. 5A and 5B are flow charts explaining the operation of the data collecting system shown in FIG. 1.

FIG. 1 schematically shows a data collecting system according to the invention. This system is designed to collect the values measured of products 12 moving along inspection line 14 in the direction of arrows. Products 12 have such a shape as is illustrated in FIG. 2.

Dimensional values A to J of each product will be measured.

A plurality of tables 16 are provided along inspection line 14. Persons 18 stand at these tables 16, one person at one table. Some measuring devices 20 are placed on each table 16. Devices 20 are vernier calipers and the like. An ID number is assigned to each measuring device 20. The task of each person 18 is to use measuring devices 20 to measure only the dimensional value or values. Work robots may be used to manipulate devices 20, thereby to automatically measure values A to J of each product 12. As will be described later, in detail, each device 20 can transmit a radio message containing the dimensional value measured of each product 12.

Host apparatus 22 is provided which is remote from inspection line 14. Apparatus 22 comprises antenna 24, receiver 26, control circuit 28, buzzer 30, alarm lamp 32, and host computer 34. Antenna 24 catches the radio message output from any measuring device 20, and supplies the message to receiver 26. The message is supplied from receiver 26 via control circuit 28 to host computer 34. Host computer 34 determines whether or not the radio message contains an error. If an error is found in the message, control circuit 28 drives buzzer 30 and alarm lamp 32, thereby demonstrating the error. Host computer 34 can collect the dimensional values contained in the radio messages supplied to receivers 26, and can analyze these values.

FIGS. 3A and 3B show vernier calipers which can be used as measuring device 20 in the data collecting system described above. As is shown in these figures, vernier calipers is comprised of caliper unit 36 and control unit 38. Caliper unit 36 includes main scale 40 and slider 42 having display 54. Control unit 38 is attached to the back of slider 42, and comprises several components a will be described later.

Main scale 40 of caliper unit 36 has graduated plate 44. A capacitor strip is embedded within this graduated plate 44. An electrode is attached to the inner surface of slider 42, and slides on the capacitor strip when slider 42 is moved in sliding contact with main scale 40. Hence, as slider 42 is moved, the capacitance delivered from this electrode changes. The changes of this capacitance can be converted into the distance between jaws 46 and 48 fixed to main scale 40 and slider 42, respectively, or into the distance between bills 50 and 52 secured to main scale 40 and slider 42, respectively. This distance, i.e., a dimensional value measured by vernier calipers, is displayed by display 54 which is a liquid-crystal display.

As is shown in FIG. 3A, transmission button 56 is provided on the finger-rest of slider 42, and screw 58 is engaged in a screw hole cut in slider 42. Screw 58 is turned to fasten slider 42 to main scale 40. Multi-digit dip-switch 60 is attached to one side of control unit 38, and can be operated to set the ID number of vernier calipers. Power-supply switch 62 is fixed to the back of control unit 38.

FIG. 4 is a block diagram showing caliper unit 36 and control unit 38 of the vernier calipers. As is shown in this figure, control unit 38 comprises CPU 64, bus line 66, ROM 68, RAM 70, transmitter 72, input/output (I/O) interface 74, transmission button 56, and dip-switch 60. CPU 64 processes measured values output from caliper unit 36 and input through I/O interface 74 and bus line 66. ROM 68 stores a control program and the like. RAM 70 can temporarily store the ID number of the vernier calipers and the values measured by the calipers. Transmitter 72 is used to transmit a radio message containing the ID number and the value measured by the vernier calipers.

As is also shown in FIG. 4, caliper unit 36 comprises charge sensor 76, amplifier 78, analog-to-digital (A/D) converter 80, and display 54. Charge sensor 76 is made of the capacitor strip embedded in graduated plate 44 and the electrode attached to the inner surface of slider 42. As has been explained, charge sensor 76 can output a voltage signal representing the dimensional value measured by the vernier calipers. Amplifier 78 is used to amplify the voltage signal output from charge sensor 76, and A/D converter 80 is used to convert the amplified voltage signal, which is an analog signal, into a digital value. Display 54 can display this digital value. The digital value can be supplied from A/D converter 80 to I/O interface 74 of control unit 38 through cable 82.

The gain of amplifier 78 is adjusted such that the digital value obtained by A/D converter 80 accurately represents the dimensional value actually measured by the vernier calipers. Further, it is subjected to zero-point adjustment, for the same purpose. In this embodiment, display 54 can display the dimensional value in six digits at most, as an effective value.

As is shown in FIG. 4, battery 84 is incorporated in control unit 38. Battery 84 is connected to power-supply switch 62. Switch 62 is coupled to power supply circuit 86. Hence, circuit 86 can supply drive voltage $V_D$ to the electronic components of the vernier calipers.

Figure 5B:
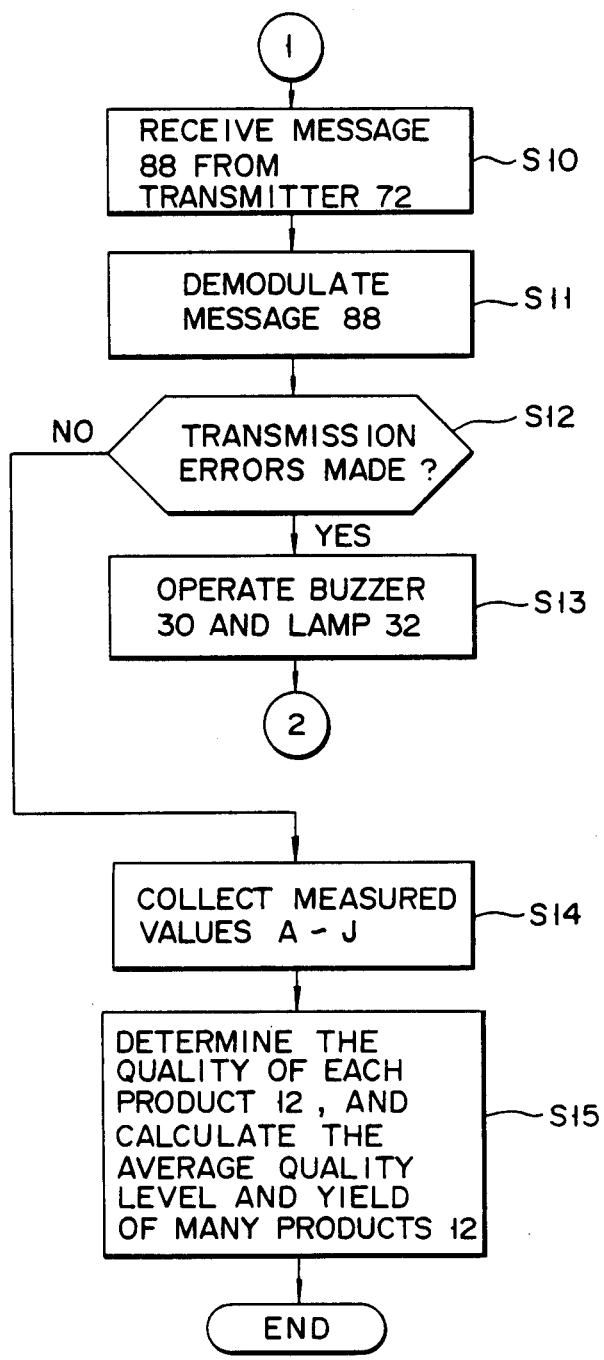

The operation of the data collecting system, which has been described, will now be explained with references to the flow charts of FIGS. 5A and 5B.

First, the person assigned to the work at each table 16 turns on power-supply switches 62 of, for example, the vernier calipers 20, so that he or she can use calipers 20 (Step S1). Then, the person operates dip-switch 60, thereby setting the ID number assigned to vernier calipers 20 (Step S2). As a result, the ID number is stored into RAM 70 (Step S3). RAM 70 keeps storing this ID number until power-supply switch 62 is turned off, or unless the person operates dip-switch 60 to change the ID number to a different ID number.

An explanation will be given below of an exemplary method for setting the aforementioned ID numbers. It is already known in the art that DIP switch 60 is a known type which permits one to set a plurality of signal (digital bit) patterns. Let it be assumed that the ID number is set. If a single pattern is set to a proper digit number by means of DIP switch 60, it is directly stored as an ID number when the operation of the respective digit switch has been completed.

Figure 8:
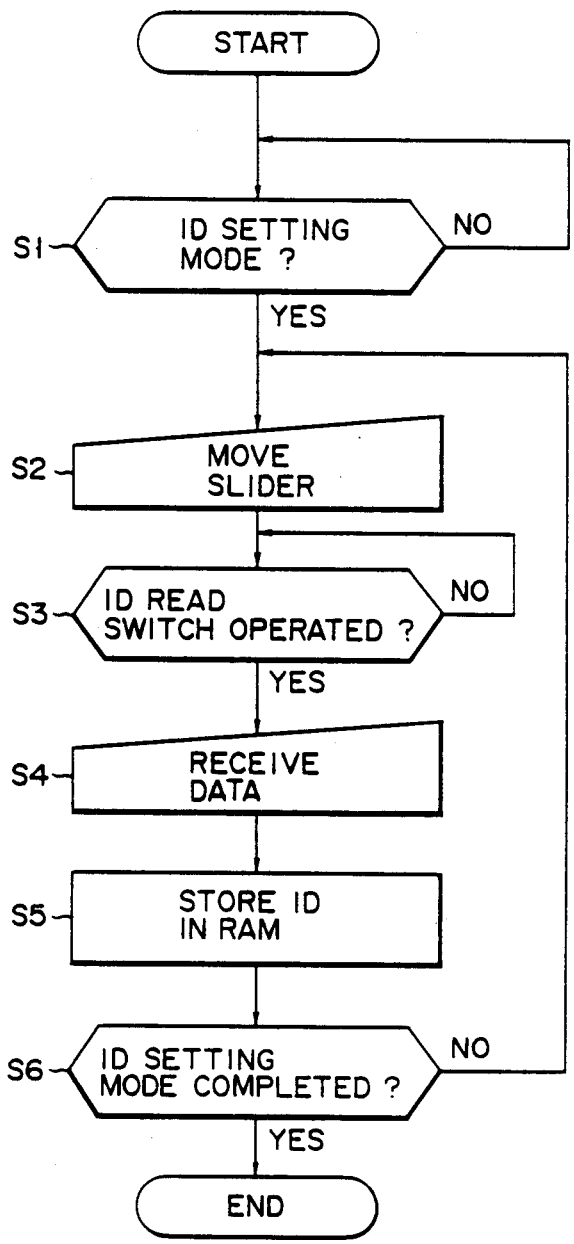
FIG. 8 is a flow chart of exemplary program control steps for setting an ID number.

Another exemplary method for setting an ID number will be explained below with reference to the flow chart shown in FIG. 8. According to this method, a switch corresponding to a proper digit of DIP switch 60 is used as a mode selecting switch, and an ID number setting mode operation is initiated by operating the mode selecting switch (step S1). In the ID number setting mode, any arbitrary or any predetermined numeral value is displayed on digital display 54 by moving slider 42 of a digital vernier's caliper (step S2). Now assume that some digits of a "digital display" numeral (for example, the upper two digits from "01" to "99") are initially set as the ID number on the caliper to which 99 or below are assigned as available digits. After the ID number is set by a two-digit numeral corresponding to the ID number, the switch corresponding to a proper digit of DIP switch 60 (which is used an in ID number read switch) is operated to produce an operation signal (step S3). In response to the operation signal, CPU 64 in control unit 38 reads the numerals in two digits as the ID number via I/O interface 74 (step S4), and the ID number is allowed to be stored in RAM 70 (step S5). By so doing, the ID number is set, and the switch corresponding to a proper digit of DIP switch 60 used as the mode selecting switch is returned to an original state, thereby completing the ID number setting mode.

Thereafter, the person measures one dimensional value of product 12 by using vernier calipers 20 (Step S4). More specifically, he or she inserts product 12 into the gap between jaws 46 and 48, and then moves slider 42 until jaw 48 of slider 42 and jaw 46 of main scaler 40 pinch product 12. While slider 42 is being moved, the value displayed by display 54 changes. The moment product 12 is correctly pinched between jaws 46 and 48, the person pushes transmission button 56 (Step S5). CPU 64 of control unit 38 reads the digital value being input to I/O interface 74 at this time, and this digital value is stored as a correctly measured value into RAM 70 (Step S6). Then, CPU 64 forms radio message 88 schematically shown in FIG. 6, which contains this measured value and the ID number of vernier calipers 20 (Step S7).

As shown in FIG. 6, this radio message 88 is formed of header 90, 2-digit ID number 92, 7-digit measured value 94, parity code 96, carriage-return (C/R) code 98, and line-feed (LF) code 100. Header 90 is a predetermined code representing that the message contains the value measured by vernier calipers 20. Parity code 96 is used to check an error made in transmitting the message from transmitter 72 to host apparatus 22. C/R code 98 indicates that radio message 88 is a complete one.

CPU 64 supplies message 88 thus formed, to transmitter 72. Transmitter 72 frequency-modulates the message output from CPU 64 (Step S8), and then transmits radio message 88 to host apparatus 22 (Step S9). The person, who holds vernier calipers 20, functions as a transmitting antenna.

FIG. 7 is a timing chart illustrating the relationship between the digital data signals forming message 88 output from CPU 64, on the one hand, and, the frequency-modulated signals output from transmitter 72, on the other hand. As may be understood from FIG. 7, digital signals 102 of message 88, which are at "0" level, are converted to frequency-modulated signals 104 of low frequency F1, whereas digital signals 102, which are at "1" level, are changed to frequency-modulated signals 104 of high frequency F2. More precisely, each digital signal 102 at "0" level (or the low level) is changed to signal 104 including n pulses, whereas each digital signal 102 at "1" level (or the high level) is changed to signal 104 including m pulses, where n is less than m.

Radio message 88, thus frequency-modulated, is received by antenna 24 of host apparatus 22, and is supplied to receiver 26 of apparatus 22 (Step S10). Receiver 26 demodulates message 88 into a digital-data message (Step S11). Demodulated message 88 is supplied from receiver 26 via control circuit 28 to host computer 34.

Host computer 34 checks parity code 96 of message 88, thus determining whether or not an error has occurred in transmitting message 88 from transmitter 72 to antenna 24 (Step S12). When an error has occurred, host computer 34 supplies control circuit 28 a signal representing this fact. In this case, control circuit 28 operates buzzer 30 and alarm lamp 32, thereby demonstrating the transmission error (Step S13). Hearing buzzer 30 making alarm sound, and seeing alarm lamp 32 emitting light, the person measures the same product 12 again, for obtaining the dimensional value of product 12 (Step S4).

Host computer 34 contains programmed data showing the order in which dimensional values A to J should be measured of each product 12 at tables 16, programmed data representing the ID numbers of measuring devices 20 for use in measuring values A to J, and programmed data representing the tolerances for values A to J. Host computer 34 checks the radio messages transmitted from measuring devices 20, in comparison with these items of programmed data. Therefore, when the person working at any table 16 measures a dimensional value other than the specific one which he or she should measure, when dimensional values A to J are measured in a wrong order, or when a wrong measuring device is used, host computer 34 determines an error has been made in inspecting product 12, whereby buzzer 30 and lamp 32 give forth an alarm.

When host computer 34 determines in Step S12 that no errors have been made, it records message 88 on a recording medium. In other words, computer 34 collects dimensional values A to J contained in messages 88 which have been correctly transmitted from measuring devices 20 to host apparatus 22 (Step S14). Computer 34 analyzes collected values A to J, thereby determining whether or not product 12 is above a predetermined quality level, and processes values A to J measured of many products 12, thereby calculating the average quality level of these products and also the yield thereof (Step S15).

Since values A to J measured of each product 12 are transmitted from measuring devices 20 to host apparatus 22, in the form of radio messages 88, no cables must be used to connect devices 20 to host apparatus 22. Therefore, devices 20 can be manipulated more easily than otherwise. The data collecting system of this invention can increase the work efficiency. In addition, since no cables and no relays are required, the data collecting system can be small.

The ID numbers of measuring devices 20 can easily represented in two digits. Hence, in the system of this invention, the number of measuring devices 20 can be increased easier than the conventional data collecting system. Furthermore, the ID numbers of measuring devices 20 can easily be altered by reprogramming host computer 34, if necessary as in the case where devices 20 are replaced by measuring devices of different types so that products of a different shape can be inspected. In other words, the system of this invention can be used to collect and analyze physical or chemical quantities of products of various kinds.

Moreover, since any value measured of a product is accompanied by an ID number, host computer 34 can reject wrong data which has been produced when a measuring device is connected to a wrong relay by a cable. Hence, the data collected by the system of this invention is reliable.

What is claimed is:

1. A measured data collecting system comprising:
   a plurality of measuring device means each of which includes:
   measuring means having a data transmission function of transmitting digital output data obtained by operating said measuring means,
   measured data message preparing means, (a) in an identification number setting mode, for storing a numerical signal of a predetermined digit of the digital output data, which is input from said measuring means, as an identification number having a unique number for identifying each measuring device means, and, (b) in a measurement mode, for incorporating the digital output data, which is input from said measuring means, and the identification number stored during said identification number setting mode, into a serial measured data message, and transmitter means for wirelessly transmitting the serial measured data message which is prepared by the measured data message preparing means during said measurement mode;

receiver means for receiving the measured data message which are sent from said plurality of measuring device means; and host computer means for identifying the measured data on the basis of the identification number included in the measured data messages received by said receiver means and for collecting the measured data thus identified.

2. A measured data collecting system comprising:

a plurality of digital measuring devices each of which includes:

digital measuring and displaying means for displaying a numeral value obtained by operating said digital measuring and displaying means, the numeral value representing a measurement result obtained during a measurement mode, identification number storing means, connected to said digital measuring and displaying means, for storing at least one digit of an arbitrary numeral value obtained by operating said digital measuring and displaying means and displayed by said digital measuring and displaying means during an identification number setting mode prior to the measurement mode as an identification number, said identification number having a unique number for identifying each digital measuring device, microcomputer means, connected to said identification number storing means and to said digital measuring and displaying means, for generating a serial digital data message including a measurement result obtained by said digital measuring device and an identification number stored by said identification number storing means, in the measurement mode, and transmitter means, connected to said microcomputer means, for transmitting RF signals encoded with the serial measured data message generated by said microcomputer means to host apparatus means; and host apparatus means which includes:

receiver means for receiving the RF signals transmitted from said plurality of digital measuring devices and for decoding said RF signals to provide said serial digital data messages, and host computer means, connected to said receiver means, for identifying respective measurement results of said digital measuring devices based on the identification number included in each of said serial data messages and for collecting the measured results of said digital measuring devices.

3. The measured data collecting system according to claim 2, wherein said ID number storing means includes reading means for reading at least one of a one-digit numeral and a two-digit numeral of arbitrary numeral values displayed on the digital display of said digital measuring device and storing means for storing the numeral read by said reading means as an ID number.

4. The measured data collecting system according to claim 3, wherein said ID number storing means includes switching means connected to said reading means for operating when an arbitrary numeral is displayed on the digital display of said digital measuring device, said reading means performing the reading of said at least one of the one-digit numeral and the two-digit numeral when said switching means is operated.

5. The measured data collecting system according to claim 2, wherein said ID number storing means includes reading means for reading at least the upper one-digit numeral of the numeral values displayed on the digital display of said digital measuring device and storing means for storing the numeral read by said reading means as the ID number.

* * * * *